United States Patent [19]

Boehm

[11] Patent Number: 5,052,719
[45] Date of Patent: Oct. 1, 1991

[54] METHODS AND APPARATUS FOR FIXING A PIPELINE TO A COUPLING

[75] Inventor: Peter Boehm, Friedrichsdorf, Fed. Rep. of Germany

[73] Assignee: Alfred Teves GmbH, Frankfurt am Main, Fed. Rep. of Germany

[21] Appl. No.: 557,371

[22] Filed: Aug. 31, 1990

[30] Foreign Application Priority Data

Sep. 1, 1989 [DE] Fed. Rep. of Germany ....... 3929074

[51] Int. Cl.$^5$ .............................................. F16L 35/00
[52] U.S. Cl. ........................................ 285/4; 285/353; 29/418; 411/5
[58] Field of Search ................ 285/2, 3, 4, 353, 356, 285/384; 29/418, 433, 456; 411/3, 5

[56] References Cited

U.S. PATENT DOCUMENTS

| | | | |
|---|---|---|---|
| 3,149,697 | 9/1964 | Bendeich et al. | 285/3 X |
| 3,630,214 | 12/1971 | Levering | 285/3 X |
| 3,794,057 | 2/1974 | Badger | 285/4 X |
| 3,916,929 | 11/1975 | Brown | 285/4 X |
| 4,029,379 | 6/1977 | Kotala et al. | 411/3 X |
| 4,304,422 | 12/1981 | Schwarz | 285/4 |
| 4,453,749 | 6/1984 | McKinnon | 285/4 |
| 4,720,204 | 1/1988 | Johnson | 285/2 X |
| 4,872,471 | 10/1989 | Scheider | 285/2 X |

FOREIGN PATENT DOCUMENTS 8805472 8/1988 Fed. Rep. of Germany .
1390727 4/1964 France .

Primary Examiner—Dave W. Arola
Assistant Examiner—Heather Chun
Attorney, Agent, or Firm—Robert P. Seitter; J. Gordon Lewis

[57] ABSTRACT

In order to simply and economically fix to an internal-thread coupling (12) a pipeline (17) furnished with two slidable external-thread connections (15, 18), the invention contemplates fabricating the two external-thread connections (15, 18) together in the shape of one part only. At a predetermined screw-in torque, one external-thread connection (15) is torn off and as a result one pipeline end (16) is safely retained in the internal-thread coupling (12). The second external-thread connection (18) may be slid to the second end (21) of the pipeline and can fix the latter to a further internal-thread connection. The fixing means and methods contemplated by the invention are automation compatible and, upon fixing, protect the pipeline from being detached from the coupling through faulty handling.

21 Claims, 1 Drawing Sheet

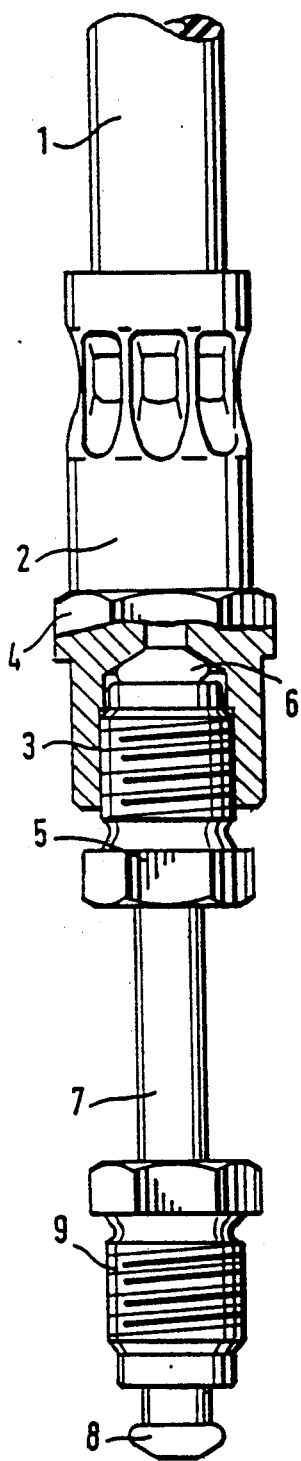
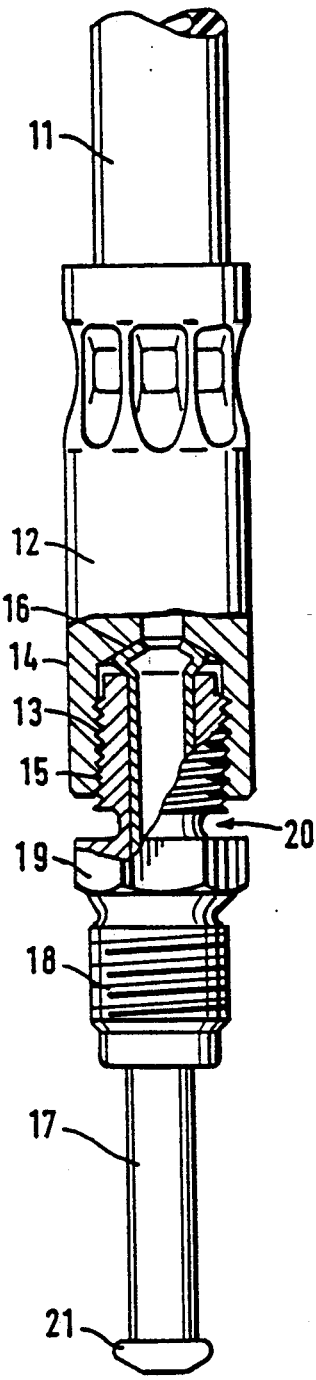
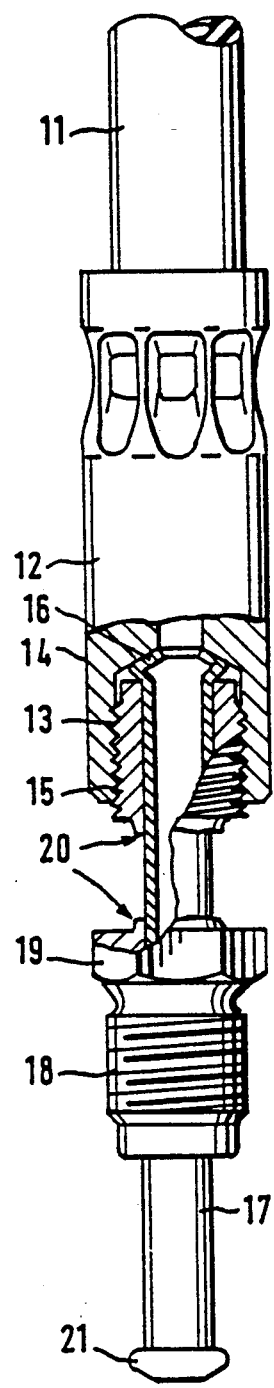
FIG.1
PRIOR ART
FIG.2
FIG.3

METHODS AND APPARATUS FOR FIXING A PIPELINE TO A COUPLING

BACKGROUND OF THE INVENTION

1. Field of the Invention

The invention generally relates to methods and apparatus for fixing a pipeline to a coupling. More particularly, the invention relates to methods and apparatus for fixing a pipeline to an internal-thread coupling, utilizing fixing means furnished with slidable external-thread connections on either side.

2. Brief Description of the Related Art

Brake hoses, used in the process of assembling by automotive vehicles, are typically furnished with couplings at the free end of the hoses. These hoses are sometimes fixed to the body and connected to the brake piping before installation of the axles. In most cases, the brakes are provided with internal-thread connections and coupled to the axles. Presently, in order to couple the brake hoses to the brakes upon installation of the axles, pipelines are used which are furnished with at least one slidable external-thread connection being turnable on the pipeline. The pipelines are usually supplied together with the brake hoses as a pre-assembled unit. A number of well known methods and apparatus can be used to fabricate the pre-assembly.

One such method (and associated apparatus) involves soldering the pipelines into the couplings. This can, however, only be done on special machines and must be done before fixing the hose to the coupling since the hose cannot withstand the soldering temperatures without damage. The cost of the soldering method can be prohibitive as well, since when fixing the hoses a large, bulky and often curved part has to be held in place.

Another prior art method involves shearing the pipelines into the couplings. This method also involves the use of expensive special machinery.

Yet another known method for fabricating the pre-assembly, is to provide the pipeline with two slidable, turnable external-thread connections and to provide the coupling with an internal-thread. This is simple and allows the aforementioned fabrication to be carried out at relatively low cost. However, in the state of the art implementation of this last method, both the internal-thread coupling and the two external-thread connections are equipped with external hexagons. As a result, it is possible that the connection between the internal-thread coupling and the pipeline can, through error (such as faulty handling) become detached.

Accordingly, it would be desirable to provide fixing means and methods which improve upon the known methods (and associated apparatus) for fabricating the pre-assembly, so that the fixing of a pipeline to a coupling cannot become detached through error. Furthermore, it would be desirable if the improved fixing methods and apparatus were simple, inexpensive, and automation compatible.

SUMMARY OF THE INVENTION

It is a principle object of the invention to provide simple and inexpensive methods and apparatus for fixing a pipeline to a coupling in such a manner as to render impossible detachment of the pipeline from the coupling, through faulty handling. It is a further object of the invention to provide automation compatible fixing means and methods, which realize the aforestated principle object of the invention.

According to the invention, these objects may be achieved by fabricating two external-thread connections as one part, and fabricating the part such that at a pre-established screw-in torque the connection screwed into the coupling is torn off and retained in the coupling. The pipeline is thus fixed to the coupling.

Furthermore, according to the invention, it is contemplated that the portion of the fixing means so torn off and retained in the coupling, is non-detachable.

The invention features a fixing means and methods which are automation compatible and realize the other stated objectives of the invention.

These and other objectives and features and advantages of the present invention will become more apparent to those skilled in the art in light of the following detailed description of the preferred embodiment of the invention, taken together with the accompanying Drawing.

BRIEF DESCRIPTION OF THE DRAWING

FIG. 1 shows a prior art fixing means for a pipeline having two slidable external-thread connections, one of which is shown being screwed into an internal-thread coupling in a part sectional view.

FIG. 2 shows fixing means, fabricated in accordance with the teachings of the invention, for a pipeline having two still interconnected slidable external-thread connections, one of which is shown being screwed into an internal-thread coupling in a part sectional view.

FIG. 3 shows the pipeline and fixing means depicted in FIG. 2 after one external-thread connection has been torn off.

DETAILED DESCRIPTION

In the accompanying drawings the invention may be readily compared with a prior art design version of the screw-in fixing means.

In particular, FIG. 1 depicts hose 1, to which a coupling 2 with internal-thread 3 is fixed. On its outside, said internal-thread coupling 2 is furnished with a hexagonal ring 4 at which it can be held unrotatably. An external-thread connection 5 is screwed into the internal-thread 3. It secures the flared, inwardly flanged end 6 of a pipeline 7 in the internal-thread coupling 2. A second end 8 of the pipeline 7, too, is flared and inwardly flanged and allows to be fixed to a further, not illustrated internal-thread by means of a second external-thread connection 9.

FIGS. 2 and 3 show a hose 11 (similar to hose 1 in FIG. 1) to which an internal-thread coupling 12 with an internal-thread 13 is secured. The surface 14 of the internal-thread coupling 12 is, however, plain. Into the internal-thread 13 an external-thread connection 15 is screwed which retains a flared and flanged end 16 of a pipeline 17 in the internal-thread coupling 12.

In FIG. 2 the external-thread connection 15 is still connected to a second external-thread connection 18 and to an external hexagon ring 19. A rupture point 20 is marked out by an arrow. This point is marked out also in FIG. 3. However, the external-thread connection 15 has already been torn off from the external hexagon ring 19 and from the second external-thread connection 18. Together with the external hexagon ring 19 the second external-thread connection 18 looks almost identical to the prior art part 9 in FIG. 1.

For assembly, internal-thread coupling 12, together with hose 11, is held (preferably by mechanical means) to prevent rotation. Thereupon, the pipeline 17 with the external-thread connections 15, 18 and with the external hexagon ring 19 is pushed in, and with the aid of the external hexagon ring 19, the external-thread connection 15 is screwed into the internal-thread 13. At a predetermined screw-in torque, the external-thread connection 15 will torn off from the external hexagon ring 19 and from the second external-thread connection 18 and will come to be secured undetachably in the internal-thread coupling 12. Subsequently, the second external-thread connection 18 will allow to be slid to the second end 21 of the pipeline 17 and be screwed into another internal-thread in the prior art manner.

What has been described in detail hereinabove are methods and apparatus for fixing a pipeline to a coupling which meet all of the aforestated objectives. Those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

What is claimed:

1. Apparatus for fixing a pipeline to an internal-thread coupling, comprising:
   (a) integrally formed fixing means, slidable over said pipeline, including at least a first external-thread connection which may be screwed into said internal-thread coupling in order to attach one end of said pipeline thereto; and
   (b) means for rupturing said fixing means so that said first external-thread connection is securely held in said internal-thread coupling and a second portion of said fixing mean is thereafter slidably displaceable from said first external-thread connection along said pipeline.

2. Apparatus as set forth in claim 1 wherein said means for rupturing causes said fixing means to separate at a predetermined screw-in torque.

3. Apparatus as set forth in claim 1 wherein said fixing means further comprises a second external-thread connection, fabricated together with said first external-thread connection as a single part.

4. Apparatus as set forth in claim 3 wherein said pipeline and said external-thread connections are integrated to form a single unit.

5. Apparatus as set forth in claim 1 wherein said fixing means and said means for rupturing are fabricated as a single part.

6. Apparatus as set forth in claim 1 wherein said internal-thread coupling presents a substantially round plain outer surface which may be utilized to secure said internal-thread coupling against rotation during fixing.

7. Apparatus for fixing a pipeline to an internal-thread coupling, comprising:
   (a) fixing means, slidable over said pipeline, including first and second external-thread connections, fabricated as a single part, wherein said first external-thread coupling may be screwed into said internal-thread coupling in order to attach one end of said pipeline thereto; and
   (b) means for separating said first and second external-thread connections upon application of a predetermined screw-in torque thereto resulting in said first external-thread connection being securely held in said internal-thread coupling.

8. A method for fixing a pipeline to an internal-thread coupling, wherein said pipeline is furnished with fixing means, including first and second external-thread connections which are slidable over said pipeline, and means for separating said thread connections at a predetermined screw-in-torque, comprising the steps of:
   (a) inserting one end of said pipeline into said internal-thread coupling;
   (b) screwing said first external-thread connection into said internal-thread coupling; and
   (c) applying a predetermined screw-in torque to sever said first and second external-thread connections, whereby said one end of said pipeline becomes fixed to said internal-thread coupling.

9. A method as set forth claim 8 further comprising the step of securing said internal-thread coupling, via mechanical means, to inhibit rotation of said internal-thread coupling during the fixing process.

10. A method as set forth in claim 8 further comprising the step of sliding said second external-thread connection, after performing said step of severing, to the opposite end of said pipeline.

11. A method for fixing a pipeline to an internal-thread coupling, comprising the steps of:
   (a) screwing slidable fixing means, including at least a first external-thread connection, into said internal-thread coupling in order to attach one end of said pipeline thereto; and
   (b) rupturing said fixing means so that said first external-thread connection is securely held in said internal-thread coupling and a severed remaining portion of said fixing means is slidably displaceable therefrom.

12. Apparatus for fixing a pipeline to an internal-thread coupling, comprising:
   (a) fixing means, slidable over said pipeline, including at least a first external-thread connection which may be screwed into said internal-thread coupling in order to attach one end of said pipeline thereto; and
   (b) means for rupturing said fixing means at a predetermined screw-in torque wherein said first external-thread connection, upon separation of said fixing means, is securely disposed within said internal-thread coupling, thereby retaining one pipeline end within said internal-thread coupling.

13. Apparatus for fixing a pipeline to an internal-thread coupling, comprising:
   (a) fixing means, slidable over said pipeline, including at least a first external-thread connection which may be screwed into said internal-thread coupling in order to attach one end of said pipeline thereto; and
   (b) means for rupturing said fixing means so that said first external-thread connection is securely held in said internal-thread coupling, said fixing means further comprising a second external-thread connection, fabricated together with said first external-thread connection as a single part, said second external-thread connection, upon the application of a predetermined screw-in torque to said fixing means, is separated from said first external-thread connection and further wherein said second external-thread connection is, after being separated from said first external thread connection, slidable over said pipeline.

14. Apparatus as set forth in claim 13 wherein said second external-thread connection further comprises means for securing said second external-thread connection to an internal-thread coupling located at the opposite end of said pipeline.

15. Apparatus as set forth in claim 14 wherein said second external-thread coupling is equipped with an external hexagon.

16. Apparatus as set forth in claim 13 wherein said fixing means and said means for separating are fabricated as a single part.

17. Apparatus as set forth in claim 16 wherein said second external-thread connection, upon said separation of said fixing means, is slidable over said pipeline.

18. Apparatus as set forth in claim 17 wherein said second external-thread connection further comprises means, including an external hexagon, for securing said second external-thread connection to an internal-thread coupling located at the opposite end of said pipeline.

19. Apparatus for fixing a pipeline to an internal-thread coupling, comprising:
(a) fixing means, slidable over said pipeline, including at least a first external-thread connection which may be screwed into said internal-thread coupling in order to attach one end of said pipeline thereto; and
(b) means for rupturing said fixing means so that said first external-thread connection is securely held in said internal-thread coupling, wherein said fixing means further comprises a second external-thread connection, fabricated together with said first external-thread connection as a single part, and wherein said pipeline and said external-thread connection are integrated to form a signal unit, and wherein said pipeline includes two flared and inwardly flanged ends.

20. Apparatus for fixing a pipeline to an internal-thread coupling, comprising:
(a) fixing means, slidable over said pipeline, including first and second external-thread connections, fabricated as a single part, wherein said first external-thread connection may be screwed into said internal-thread coupling in order to attach one end of said pipeline thereto; and
(b) means for separating said fixing means at a predetermined screw-in torque resulting in said first external-thread connection being securely held in said internal-thread coupling, wherein said first external-thread connection, upon separation of said fixing means, is torn off and undetachably retained within said internal-thread coupling, thereby retaining one pipeline end within said internal-thread coupling.

21. Means for fixing a pipeline to a threaded coupling comprising:
an integrally formed generally tubular member slidable over said pipeline, including first and second threaded connectors interspaced by member rupturing means, operative, upon mating engagement of said first threaded connector with said threaded coupling and application of a predetermined torque between connectors to separate said connectors, whereby said first connector remains securely engaged with said coupling to attach one end of said pipeline thereto and the second connector is thereafter slidably displaceable from said first connector along said pipeline.

* * * * *